May 6, 1941.                    C. R. THEODORE                    2,240,815
                                   FOOD SLICER
                                Filed Nov. 10, 1938
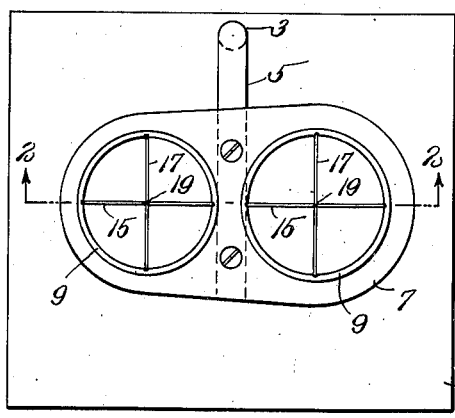
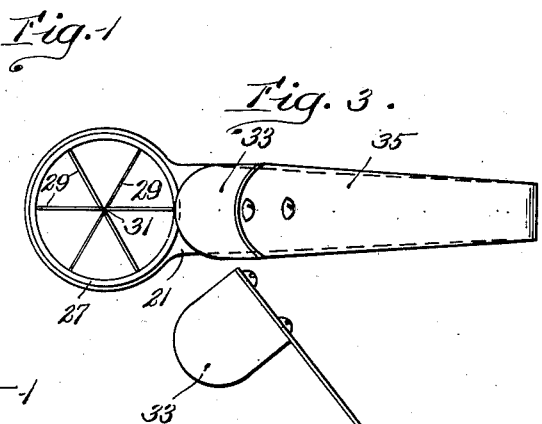
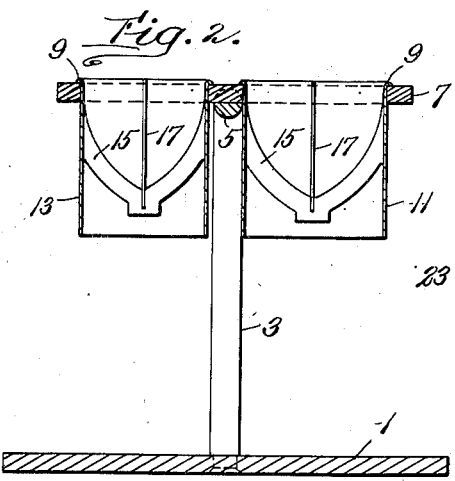
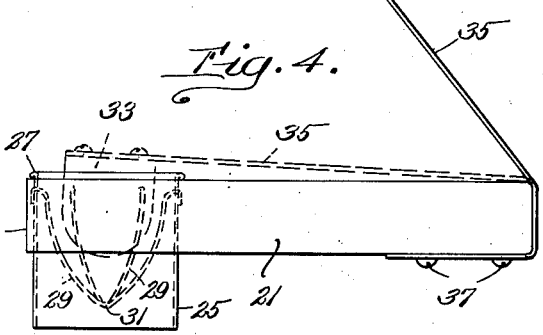
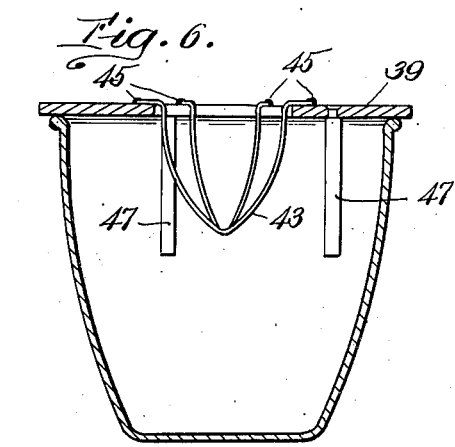
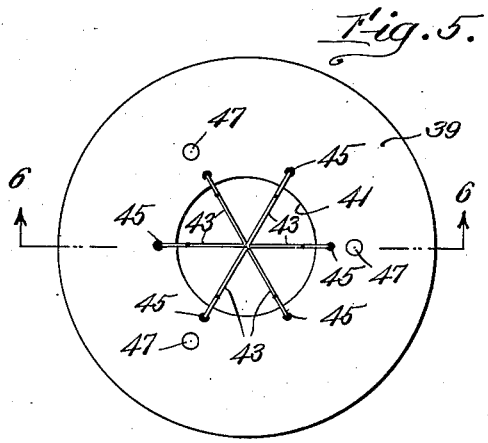
Inventor.
CHRISTY R. THEODORE
by Robert K. Randall
     Atty.

Patented May 6, 1941

2,240,815

UNITED STATES PATENT OFFICE 2,240,815

FOOD SLICER

Christy R. Theodore, Brookline, Mass.

Application November 10, 1938, Serial No. 239,813

7 Claims. (Cl. 146—2)

The present invention relates in general to culinary devices for slicing up articles of food for the table, and has as its main object the provision of a novel and inexpensive device which will quickly and neatly slice soft, yielding or crumbling articles of food, such as hard boiled eggs, bananas, pickles, and the like simultaneously along a number of planes through the longitudinal axis of the article to divide it into equal and symmetrical sectors. Such sectors are used for garnishing and decorating salads and a variety of other dishes, in which their main purpose is to make a favorable appeal to the eye. To do so, they must be cut cleanly and truly, without crumbling or distortion. There is a particular problem involved in the slicing of hard boiled eggs, in that the white of the egg is relatively tough and rubbery, while the yolk of the egg is crumbly and non-elastic and has little adherence to the white, and hence the distortion incident to passing a knife blade through the white of the egg breaks up and splits off the sector of yolk intended to remain attached to the corresponding sector of the white. The time involved, and the difficulty of slicing an egg by hand with a knife into neat and equal pieces are well known, as well as the risk of injury to the fingers since the knife must be sharp and the egg is difficult to hold. On account of these difficulties, the egg is commonly sliced across its axis into disks, which lack the attractiveness of the sectors. It is still the common practice to perform this operation by hand in the absence of any really satisfactory device for doing the work, as those devices which have been proposed for the purpose do not adequately support the egg against flattening and accompanying crumbling of the yolk, and thus do not do a good enough job.

To the end of devising a satisfactory apparatus for slicing hard boiled eggs and other similar articles of food lengthwise into sectors simultaneously at a single operation, while obviating the disadvantages enumerated, I provide a plurality of knives or blades radiating from a common point and thus disposed in planes which intersect each other, the knives being oblique to the line of relative travel of the article to be cut, thus giving a gliding cutting action; also the obliquely related cutting edges of the knives are convergently arranged and engage and cut the surface of the article simultaneously at a number of points around its periphery, so that the resistance to penetration of any one blade serves to thrust the article the more firmly against another blade; further, such resistance to cutting creates a force which is directed inwardly of the article simultaneously from a plurality of points about its surface which tends to compress or hold the egg or other article together, instead of a flattening, distorting force tending to flatten and crush or burst the article and to crumble the yolk in the specific case of an egg, as has been true of the hand-operated knife and other devices proposed for this purpose.

Preferably, the knives are curved to follow as closely as possible the curvature of the end of the egg or other article that is presented to them, and their ends are substantially equidistant from a line through the common point from which they radiate, and spaced apart diametrically for a distance that is less than the expected diameter of the article cut. By reason of this shape and relation, the inwardly directed compressing and supporting action of the plurality of blades in holding the article from distortion is enhanced, and any resistance to being cut by any one of the blades, which would otherwise tend to spread the article laterally as in the case of plane knives, is made of use to force the article against the knife at the opposite side of the axis and thus start the cutting; additionally, these end portions of the blades which curve around into substantially parallel relation with the direction of travel of the article serve as guides to maintain the article in its properly oriented end-on relation and to center the article symmetrically with respect to the point of intersection of the several blades with each other, without regard to the fit of the article within the guide tube. A variety of supporting means for the knives is employed in practice, and includes in certain instances a guide tube outside the knives amplifying the supporting action of the substantially parallel portions of the opposing curved knives in holding the article together during the cutting.

Other aims and features of the invention, and the manner of their attainment, are as will be made plain hereinafter.

Illustrative embodiments of the invention are shown in the accompanying drawing, in which Figs. 1 and 2 are respectively plan and part sectional elevations of a slicer embodying the invention having two sets of knives equipped with guide tubes, mounted on a stand for bench or counter use.

Figs. 3 and 4 are plan and side elevational views respectively of a slicer to be held in the hand while being used, showing also a follower for use in forcing an egg through the slicer.

Fig. 5 is a plan view of a slicer embodying the invention, in a simpler form.

Fig. 6 is a view partly in section on line 6—6 of Fig. 5, showing the form of Fig. 5 supported for use on the rim of a bowl.

In the embodiment shown in Figs. 1 and 2, a base 1 supports an upright 3, on the horizontal top portion 5 of which is fixed a horizontal plate 7 having two apertures within which are supported by means of their slight lips or beads 9 the two guide tubes 11, 13. Within each of these tubes is provided a plurality of knives 15, 17, each cut out of thin sheet metal with its concave upward edge sharpened and cut on a curve which approximates a parabola, except that the lowest point of the curve is slightly more acute to avoid presenting any portion of the edge at right angles to the thrust of the article of food that is to be pressed therethrough in order to cut it. The opposite ends of each blade are welded, soldered, or otherwise suitably affixed to the interior walls of the guide tube near its top end. The top edge of knife 15 is notched at its lowest point, and the bottom edge of knife 17 is correspondingly notched, and the two are interengaged in obvious manner to maintain them against relative motion at this point. The two knives intersect at right angles at the point 19 where they are notched together, so that the four blades which they form will slice into four equal longitudinal sectors the egg or other article which is pushed downward through the guide tube with the fingers of one hand, while the fingers of the other hand grasp and withdraw the egg from the bottom of the tube after it has been sliced but while the component parts are still in the same relation as before slicing was effected, thus handling the sliced egg as a unit.

The two slicing tubes may be made of slightly different diameter, as shown, the larger one, 11, being intended for hen's eggs, beets, cucumbers, and the like, the smaller one, 13, for pullet's eggs, bananas, pickles, carrots, and other articles.

Because of the curved and oblique relation of the knives and their consequent compressing action on the article during the cutting which serves to hold the egg or other article together rather than tending to flatten and burst it as do the previously employed knives and devices with their plane or convex edges, it is not necessary to have a sharp edge on the blades 15, 17, and hence there is little or no risk of injury to the fingers in using or in washing the device.

Indeed, it is found that satisfactory results are obtained through the use of fine stainless steel wires for blades to effect the cutting. These are shown in the remaining embodiments of the invention. Fig. 3, which is a device to be held in one hand while the sliced egg or other article is caught or withdrawn by the other hand, comprises a handle 21 of any simple construction from the left-hand end of which a strap 23 encircles the guide tube 25 just below its rim or lip 27. The three wires 29 which form the six blades designed to slice the egg or other article into six longitudinal sectors, in the present case, have their opposite extremities run through holes in sleeve 25 just below the lip 27, and thereafter bent reversely down along the outer wall of tube 25 and welded or soldered thereto. The intermediate portions of the wires 29 are bent into general parabolic shape, only slightly more pointed at the apex 31 as before, and are welded, twisted, or soldered together at such apex which is located on the axis of the tube. It is to be noted that the wires extend inwardly away from the walls of the tube 25 adjacent their upper ends, before curving downward and inward to their point of junction at 31; thus, the space between the upper ends of the opposite blades can be made small enough to engage the smallest egg or other article on which the device is likely to be used, while providing plenty of clearance between a considerably larger egg and the interior walls of the tube, so a single size of device made according to this plan will serve for a considerable range of sizes of eggs or the like. A follower or presser 33 is illustrated in connection with this form of the invention, which comprises a block of wood, metal, or sponge roughly conforming to the shape of the space within the basket formed by the wires 29, or by the knives 15, 17, mounted on the free end of a spring-steel strap 35 fastened at 37 to the underside of handle 21. After the egg is dropped end first in the basket of wires 29, the follower 33 is pressed downward on top of the egg by the thumb of the hand holding handle 21, while the other hand catches the pieces or assists in drawing the egg through the tube 25.

The form of Figs. 5 and 6 represents a greatly simplified structure employing the principles of the invention for household use where the occasions for use of the device do not warrant a more costly construction. In this simple form, a flat disk 39 has a central aperture 41 within which blades formed of wires 43 similar to those of Figs. 3 and 4 are disposed in radial, pendent, and substantially parabolic relation similar to those already described, with their extremities soldered as at 45 or put through holes or otherwise attached to the top surface of disk 39. Three legs 47 are fixed in the disk and are at least coextensive with the basket formed by the wires 43, so as to protect the latter from crushing when not in use. In use, the device is intended to be placed upon the rim of a bowl, which will catch the sectors of the article as it is pressed through the basket from above by the fingers. Obviously, also, the device can be supported upon the fingers of one hand, which will receive the sectors, while the egg or other article is pushed through by the other hand.

Not only do the devices of the invention do expert work with certainty and rapidity and without requiring skill, but they are inexpensive to make and easy to keep clean and sanitary.

While I have illustrated and described certain forms in which the invention may be embodied, I am aware that many modifications may be made therein by any person skilled in the art, without departing from the scope of the invention as expressed in the claims. Therefore, I do not wish to be limited to the particular forms shown, or to the details of construction thereof, but What I do claim is:

1. A slicer for articles of globular and ovoid shapes comprising a support having a tube through which the article to be sliced is pushed, and a plurality of cutting wires disposed within the tube in planes intersecting along the line of the axis of such tube, the cutting wires converging toward each other in the direction away from the support and conforming to the contour of the article being cut, so as to support the article against distortion and rupture under the pressure needed to effect the cutting and also to center the article on such axis.

2. An egg slicer comprising in combination a support having an aperture through which the egg to be sliced is pushed, and curved wires attached by their ends to the sides of the aperture and crossing each other in line with the center of the aperture, and through their flexibility holding the egg with its axis in such center-line as the egg is pushed through the wires.

3. An egg-slicer comprising in combination a support, a tube mounted on such support, and a plurality of curved flexible wires disposed in different planes extending diametrically across the tube, the wires being disposed in convergent relation to each other and through their flexibility conforming to the shape of both the side-portions and the end-portions of an egg so as to align the axis of the egg with the meeting-point of the convergent wires and to cut both portions simultaneously when the egg is thrust endwise through the tube.

4. An egg-slicer comprising, in combination, a plurality of blades arranged in oblique and convergent relation to each other, each blade having its cutting edge curved in profile to match substantially that portion of the profile of an axial section of an egg which extends from near its axis to its point of greatest width, and a tube surrounding the blades preventing flaring of the cut slices and maintaining the egg in axial alignment with the tube and the blades.

5. An egg-slicer comprising, in combination, a support having an aperture through which the egg is fed, and a plurality of curved flexible cutting wires in and obliquely disposed to the path of travel of the egg through the aperture, and through their flexibility conforming to the shape of the proximate half of an egg and thus both centering and slicing the egg when the latter is pressed endwise between them.

6. A slicer for articles of globular and ovoid shape comprising in combination a plurality of thin wires radiating symmetrically from a common point on an axial line with their opposite ends substantially equidistant from such line and their intermediate portions curved and conforming to the contour of the opposing surface of the article to be sliced as the latter is forced past the wires, and a tube coaxial with and surrounding the plurality of wires and maintaining the article being sliced in substantial axial alignment with such axial line.

7. An egg-slicer comprising a support having an aperture through which the egg to be sliced is pushed endwise, and a plurality of cutting edges of generally parabolic curvature suspended by their ends from the support and with their intermediate portions crossing each other and joined together without increased thickness at such junction in line with the center of such aperture, and through their substantial conformation to the shape of the egg coming into cutting engagement with both the side-portions and the end-portions of the egg at the same time and also centering the egg's axis on such center line of the aperture.

CHRISTY R. THEODORE.